June 15, 1948.    W. E. MOULTON    2,443,567
FISHING ROD HANDLE
Filed Sept. 28, 1944

Walter E. Moulton  INVENTOR.
BY  Frank M. Slough

Patented June 15, 1948

2,443,567

UNITED STATES PATENT OFFICE 2,443,567

FISHING ROD HANDLE

Walter E. Moulton, Geneva, Ohio, assignor to The American Fork & Hoe Company, Cleveland, Ohio, a corporation of Ohio Application September 28, 1944, Serial No. 556,226

2 Claims. (Cl. 43—22)

My invention relates to fishing rod handles and relates more particularly to improved means for detachably mounting a conventional type reel thereon.

It is an object of my invention to provide improved means for securing a conventional type reel to the reel seat of a fishing rod handle which will be simple in construction, inexpensive to manufacture and efficient in use.

Another object of my invention is to provide improved means for seating the conventional reel to the reel seat of a fishing rod handle whereby the seating thereof is rapid and secure.

Another object of my invention is to provide improved means for locking the conventional type reel to the reel seat of a fishing rod handle.

Other objects of my invention, including better symmetry and better balanced strength over prior art handles, and the invention itself will become increasingly apparent from a consideration of the following description and drawing wherein.

Figure 1:
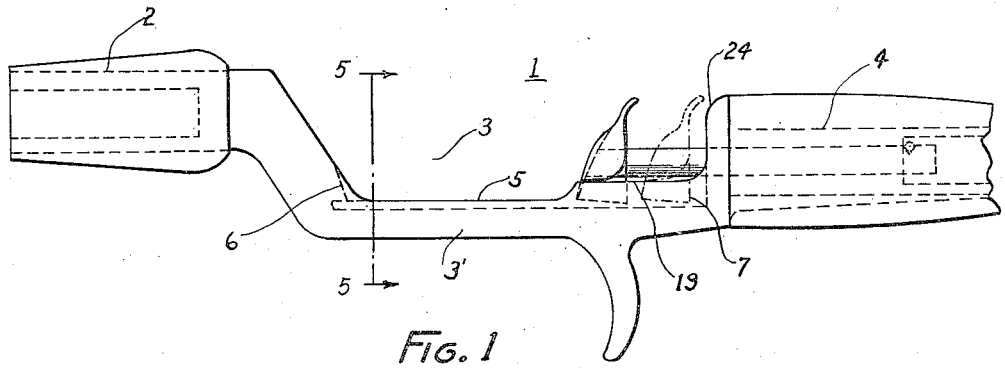
Fig. 1 is an elevational view of a fishing rod handle embodying my invention, dotted lines illustrating an operative position which the clamping means of my invention will take.

Referring now to the drawing, I have shown at 1 a fishing rod handle preferably formed of a light metal, such as aluminum, including a tubular portion 2 adapted to receive the butt end of a fishing rod, an intermediate reel seat portion 3 and a hand grip portion 4. The hand grip portion 4 preferably is encased in cork and the butt receiving end in plastic, as shown.

The reel seat 3 comprises a depressed portion 3' upon which the reel base rests, having upstanding lateral flanges 5—5 limiting transverse movement of the reel base, and an undercut portion 6 adapted to receive the toe of the reel base and an undercut portion 7 adapted to receive the heel thereof.

The hand grip portion 4 is centrally bored, as at 21, the inner periphery thereof being relatively smaller in the more forwardly disposed portion 8 and greater at the medial and outwardly disposed portion 9 thereof.

The improved clamp means of my invention include a plunger element 10, and a spring element 11, ball means 12 and screw threaded cap means 13. The plunger element 10, of my invention, comprises a heel element 14 and a stem portion 15, the said heel as best shown in Figs. 3 and 4 having a curved head 16, a pair of ears 17, shoulders 18 adapted to ride upon shoulders 19 of the seat 3, and an arcuate bottom 20, the said bottom spanning the space between the oppositely disposed shoulders 19 when the stem, in its assembled position, is projected within the bore 21 of the hand grip portion 4.

Figure 2:
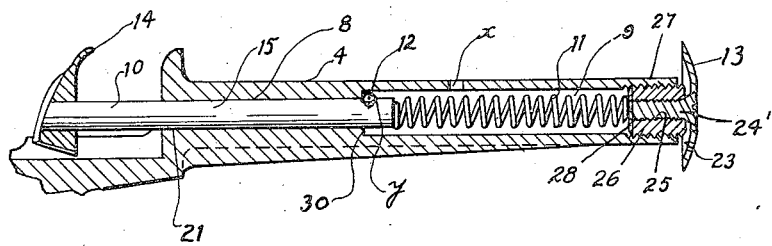
Fig. 2 is a sectional view of a part of the clamping means of my invention.
Figure 3:
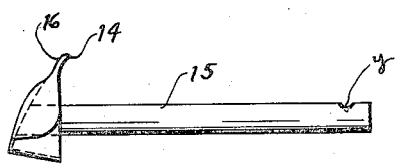
Fig. 3 is an elevational view of another part of the clamping means of my invention.
Figure 4:
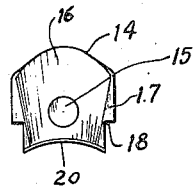
Fig. 4 is a front elevational view of the clamping means of Fig. 3.
Figure 5:
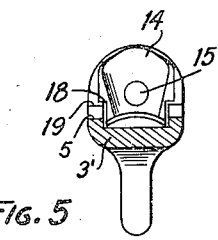
Fig. 5 is a transverse sectional view taken on the line 5—5 of Fig. 1.

At x, Fig. 2, I show a small aperture disposed centrally of the said grip portion 4 and in Fig. 3, a depression y in the stem 10. In assembling the handle in manufacture, after projecting the plunger into the hand grip portion 4 through the aperture 21 and inserting the spring 11 into portion 9 of the grip 4, wherefore said spring is caused to abut the rear end of the stem, I align the depression y with the aperture x and drop a ball 12 through the aperture x into the depression y.

A cork sheath is then telescoped over the grip portion 4 locking the ball within the depression y and a cap 13 formed of a disc member 23 and screw element 24' is then screw threaded into the internally screw threaded portion 25 of a plug element 26 screw threaded within the outer end portion 27 of the portion 9 of the grip element and terminates in a washer 28 which abuts the outer end of the spring 11 wherefore the ball 12 in the depression is carried into engagement with the shoulder 30 formed by the step up of the larger bore from the smaller one, wherefore the amount of forward movement of the plunger element 10 is limited. It will be noted that the ball is of such size as to be retained in the depression and to be carried from a position beneath the aperture to the shoulder without becoming unseated in the depression, the spring 11 exerting sufficient pressure to continuously urge said ball in such locking engagement with the shoulder.

It will be noted that the ball lock described is a positive lock for the completed plunger and that smooth operation is ensured. To secure the reel to the handle, the handle is grasped in one hand and the reel in the other, and the front wheel seat is seated into the handle notch 6 and the rear reel seat end placed against the concave plunger head. A firm pressure downwardly on the reel will automatically snap the same into its final position.

The plunger element, being longitudinally reciprocably movable in the handle portion, the improved clamp of my invention is adapted to mount various size reels. To remove the reel from the handle, the heel which is concaved, as hereinbefore described, is simply drawn rearwardly by the thumb of the operator against the action of the spring 11 and the reel, being grasped in the other hand, is removed from its seating with the handle.

The heel portion 24 of the reel seat 3 is, in the form of my invention herein illustrated and described, preferably shaped to receive the curved head 16 and the concaved heel in nesting relation when the heel is drawn back to its rearmost position, and the heel 24 of the reel seat acts, in this position, as a rest therefor.

The improved clamp of my invention thus permits rapid assembling of the reel with the fishing rod handle and a secure lock when so assembled.

Although I have shown and described a preferred embodiment of my invention, I am aware that numerous and extensive departures may be made therefrom without departing from the spirit of the invention and the scope of the appended claims.

I claim:

1. The combination with a fishing rod handle comprising a reel support having a rod receiving socket at its forward end and a tubular hand grip end, a reel seat intermediate said ends, of unitary reel clamping means comprising a stem projecting through the bore of said hand grip and a wedge clamp element secured at the forward end of the stem and extending forwardly of the hand grip, said wedge clamp element being adapted for reciprocable movement with respect to the reel seat, spring means telescoped within the rearward portion of said hand grip and adapted to exert forward pressure on said stem tending to urge said clamping means into the reel clamping position on said reel seat, and ball means carried by said stem adapted to engage said hand grip whereby said forward movement of said clamping means is limited.

2. The combination with a fishing rod handle comprising a reel support having a rod receiving socket at its forward end and a tubular hand grip end, a reel seat intermediate said ends, reel clamping means comprising a plunger element consisting of a stem portion adapted to be telescoped within the said hand grip portion of the handle and a manually operable heel portion disposed within the reel seat and adapted to have reciprocatory movement with respect thereto in response to manual pressure, spring means telescoped within said hand grip portion adapted to exert forward pressure on said plunger element, said hand grip portion having an aperture disposed medially thereof, said stem portion of said plunger element being provided with a depression therein, ball means adapted to be inserted through said aperture into said depression and adapted to abut downwardly extending means carried by the hand grip portion to limit forward movement of said plunger element whereby the amount of forward reciprocatory longitudinal movement of said plunger element with respect to said reel seat is limited.

WALTER E. MOULTON.

REFERENCES CITED

The following references are of record in the file of this patent:

UNITED STATES PATENTS

| Number | Name | Date |
|---|---|---|
| 844,448 | Gaylor | Feb. 19, 1907 |
| 918,062 | King | Apr. 13, 1909 |
| 1,457,964 | Doty | June 5, 1923 |
| 2,289,216 | Seidel | July 7, 1942 |

FOREIGN PATENTS

| Number | Country | Date |
|---|---|---|
| 263,592 | Germany | Sept. 10, 1913 |
| 150,385 | Switzerland | Jan. 16, 1932 |